United States Patent
Kawai et al.

(10) Patent No.: US 7,022,391 B2
(45) Date of Patent: Apr. 4, 2006

(54) PACKAGING MATERIAL FOR ELECTRONIC-PART CASE, AND OTHERS

(75) Inventors: Hideo Kawai, Tokyo (JP); Katsumi Tanaka, Tokyo (JP); Takahiro Aoyama, Suita (JP); Mitsuo Nakazaki, Suita (JP)

(73) Assignees: Showa Denko Packaging Co., Isehara (JP); Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/398,653

(22) PCT Filed: Oct. 12, 2001

(86) PCT No.: PCT/JP01/08974

§ 371 (c)(1),
(2), (4) Date: Oct. 7, 2003

(87) PCT Pub. No.: WO02/31898

PCT Pub. Date: Apr. 18, 2002

(65) Prior Publication Data

US 2004/0142190 A1  Jul. 22, 2004

(30) Foreign Application Priority Data

Oct. 13, 2000 (JP) .............................. 2000-313311
Jun. 25, 2001 (JP) .............................. 2001-191656

(51) Int. Cl.
  *B29D 22/00* (2006.01)
  *B29D 23/00* (2006.01)
  *B32B 1/08* (2006.01)

(52) U.S. Cl. ................... 428/36.7; 428/35.9; 428/458; 428/461

(58) Field of Classification Search ............... 428/35.9, 428/36.7, 216.7, 334, 424.8, 458, 461, 910
See application file for complete search history.

(56) References Cited

FOREIGN PATENT DOCUMENTS

| JP | 59-173944 | 10/1984 |
| JP | 8-1857 | 1/1996 |
| JP | 8-83596 | 3/1996 |
| JP | 9-213285 | 8/1997 |
| JP | 09230138 A * | 9/1997 |
| JP | 9-275043 | 10/1997 |
| JP | 9-288997 | 11/1997 |
| JP | 10-157008 | 6/1998 |
| JP | 2000-123799 | 4/2000 |
| JP | 2000-219746 | 8/2000 |
| JP | 2000-223084 | 8/2000 |
| JP | 2001-11658 | 1/2001 |
| JP | 2002-25511 | 1/2002 |
| WO | WO 9500598 A1 * | 1/1995 |

* cited by examiner

*Primary Examiner*—Michael C. Miggins
(74) *Attorney, Agent, or Firm*—Oblon, Spivak, McClelland, Maier & Neustadt, P.C.

(57) ABSTRACT

The present invention provides a casing material for an electronic component which has a good adhesion with an aluminum foil and a resin layer, impermeability of steam, heat seal property, and corrosion resistance for an electrolyte. The present invention also provides a casing for an electronic component using the casing material. The present invention also provides an electronic component including the casing. The casing material comprises a heat resistant resin drawn film layer as an outer layer, a thermoplastic resin not-drawn film as an inner layer, and an aluminum foil layer provided between the layers. In particular, an acrylic polymer layer is provided between the aluminum foil layer and the not-drawn film layer.

24 Claims, No Drawings

PACKAGING MATERIAL FOR ELECTRONIC-PART CASE, AND OTHERS

TECHNICAL FIELD

The present invention relates to a casing material for an electronic component, which can be used as a casing for an electronic component such as a lithium ion battery and a capacitor. It also relates to a casing for an electronic component, an electronic component equipped with the casing and a packaging material.

BACKGROUND ART

In recent years, electric equipment such as voice equipment and visual equipment has become small, light and thin. Especially, in the OA (Office Automation) field, a personal computer has been miniaturized, e.g., from a desktop type to a notebook type, and a memory card has been developed. Furthermore, the aforementioned electric equipment is designed to be connected with a cellular phone.

As electronic apparatus has become small and light, a secondary battery and/or capacitor are required to have an improved performance and lightweight. To cope with the aforementioned requests, a secondary battery has been changed from a conventional lead storage battery to a nickel-cadmium battery or a lithium battery having high energy density. Recently, a lithium-ion secondary battery and a nickel-hydrogen secondary battery have become popular. Thus, the development in this field has been made quickly. Furthermore, an electrical double layer condenser, which can be used as a power supply of a hybrid car because of its high volume energy density, durable charge-and-discharge performance, is being put in practical use.

A secondary storage battery is required to be charged and discharged repeatedly. In this secondary storage battery, if moisture is mixed therein at the time charging, hydrolysis of the electrolyte and/or organic solvent may occur. Furthermore, if oxygen and/or moisture contained in the ambient air are introduced into the battery, deterioration and/or decomposition of the positive active material, negative electrode active material and/or conductive polymer may occur. Accordingly, the casing for an electronic component is required to be strictly sealed. The similar requirement is applied to an electronic component, such as an electric double layer condenser containing non-basin electrolyte.

To cope with such requirements of lightweight and sealing, it has been proposed that a laminated member laminating a thermoplastic resin film and an aluminum foil is used as a casing material for an electronic component.

For example, Japanese Unexamined Laid-open Patent Publication S59-173944 (hereinafter referred to as "JP59-173944") proposes a casing material for an electronic component. In the casing material, an aluminum thin foil is covered by a resin film, or an aluminum thin foil is sandwiched between resin films.

Japanese Unexamined Laid-open Patent Publication H8-83596 (hereinafter referred to as "JP8-83596") proposes to utilize a lamination of polyethylene film/aluminum film/polyethylene film as a casing material for a thin card-shaped battery.

Japanese Unexamined Laid-open Patent Publication H9-213285 (hereinafter referred to as "JP9-213285') proposes a casing material for an electronic component. The casing material has a multi-layer structure including at least one aluminum foil layer as an inner layer, and is formed into a cylindrical shape.

Japanese Unexamined Laid-open Patent Publication H10-157008 discloses a lamination film of polyethylene film/aluminum foil/hot melt layer/oriented polyester film. The publication also proposes to obtain a battery casing by thermally forming the laminated film. It is thought that a polyester film of copolymerization polyester having good thermoforming nature is preferably used as the aforementioned polyester film.

The aforementioned casing material as taught by JP59-173944 is formed by heat-pressing the end portions of a laminated member in which an aluminum foil having a thickness of 20 µm is sandwiched between polyethylene layers each having a thickness of 100 µm. The sealing is performed by heat-sealing the casing material. The casing material as taught by JP8-83596 is used as a casing material for a thin card-shaped electronic component. This casing material requires a large sealing portion (a heat sealed portion of external casing materials so as not to allow an invasion of air or moisture into an inside of battery) at an external peripheral portion of a power generation component of a battery. The ratio of the area and volume of the sealing portion to those of the entire battery is large, which impedes to increase the volume energy density of the battery.

Furthermore, according to the teaching of JP9-213285, the aluminum laminated member is formed into a cylindrical shape, then a power generation element is inserted into the cylindrically formed casing. Then, the lower and upper openings thereof are sealed by heat sealing or adhesive agent. Thus, the sealing area can be halved, and the volume energy density can be increased as compared with the aforementioned casing for a thin card-shaped electronic component. However, it must be said that the energy density is still inadequate.

The casing material as taught by JP10-157008 is to be subjected to heat forming. Since polyethylene is used as the materials of the inner film, it is difficult to satisfy the high temperature preservation examination (safety examination) of a battery requiring enough bonding strength at high temperature. In order to thermally forming it, it is preferable that the polyester film is a polymerization polyester film. On the other hand, since the oriented polyester film is inferior in adhesive performance, it thermally contracts at the time of thermoforming and cannot obtain sufficient bonding strength by a normal dry laminating adhesive. Thus, it is required to use hot-melt adhesive agent.

Furthermore, in place of the conventional aluminum casing with a vinyl chloride resin cover, a casing made of thermoplastic nylon lamination and aluminum materials (see Japanese Unexamined Laid-open Patent Publication No. H8-001857) or thermoplastic-polyester resin painted aluminum materials (see Japanese Unexamined Laid-open Patent Publication No. H9-275043) has become available. Thus, materials have been developed to decrease the weight and avoid the use of vinyl chloride resin.

Furthermore, another capacitor casing material has been proposed (see Japanese Unexamined Laid-open Patent Publication No. 2001-011658). The casing material includes an aluminum foil having a roughened surface, a chemical coating formed on the roughened surface and an organic resin covering formed on the coating.

In order to obtain a battery with high volume energy density that can be mounted in a miniaturized and thinned housing of an electronic apparatus, the casing of the battery is required to have a shape corresponding to the available space of the printed circuit board so that it can be fitted in the space without casing any dead space. In order to meet the aforementioned requirements, it is required that the casing is thin and has a sharp shape. Therefore, it is required that the aluminum foil laminated member is thinner, and can be formed into a desired shape sharply.

Judging from this point of view, since the aforementioned conventional material for a battery casing has, for example, a structure of polyethylene film (100 μm)/aluminum foil (20 μm)/polyethylene film (100 μL m) or polypropylene film (100 μm)/aluminum foil (20 μm)/polypropylene film (100 μm), the formability thereof is not satisfactory. Thus, the material cannot be used as it is.

Another proposal has been made. In this proposal, the casing for an electronic component has a structure of heat-resistant-resin oriented film/aluminum foil/polyolefine film, acid denaturized polyolefine film or ionomer resin film from the surface. This casing is thin and good in formability, and can dissolve almost all of the aforementioned problems. However, polyolefine, acid denaturized polyolefine or ionomer resin cannot assuredly prevent permeation of non-water-electrolysis liquid of a lithium battery, to thereby cause invasion of the aluminum foil. Furthermore, in case of using polyolefin resin, the adhesive property to the aluminum foil becomes insufficient. Thus, it was necessary to solve these problems. The similar problems can also be applied to a capacitor casing of a capacitor containing non-water-electrolysis.

It is an object of the present invention to provide a casing material for an electric component which is excellent in formability such as overhang forming and a deep drawing forming, excellent in strength, excellent in adhesive performance between an aluminum foil and a resin layer, excellent in impermeability of moisture, excellent in heat sealing performance, and will not be invaded by corrosive electrolyte.

It is another object of the present invention to provide a casing for an electric component.

It is still another object of the present invention to provide an electric component such as a storage battery with high volume energy density and a capacitor equipped with the aforementioned casing.

DISCLOSURE OF INVENTION

In order to attain the aforementioned objects, the present inventors have studied eagerly and found the fact that the objects can be attained by providing an acrylic polymer layer between an aluminum foil layer and a not-drawn film layer (or unoriented film layer). Furthermore, the present inventors also have found that a polymer having at least one organic group selected from the group consisting of hindered amino group, cycloalkyl group and benzotriazol group, each group having a specific structure, can be preferably used as the aforementioned acrylic polymer layer to thereby perform remarkable effects. Thus, the present invention has been completed.

According to a first aspect of the present invention, a casing material for an electronic component, wherein the casing material comprises a heat resistant resin drawn film layer (or heat resistant resin oriented film layer) as an outer layer, a thermoplastic resin not-drawn film layer (or thermoplastic resin unoriented film layer) as an inner layer and an aluminum foil layer disposed between the drawn film layer and the not-drawn film layer, is characterized in that: an acrylic polymer layer is provided between the aluminum foil layer and the not-drawn layer.

It is preferable that the acrylic polymer layer is made of a polymer having at least one organic group selected from the group consisting of hindered amino group, cycloalkyl group and benzotriazol group.

It is preferable that the acrylic polymer layer comprises a polymer obtained by crosslinking an acrylic polyol with an isocyanate.

It is preferable that the aluminum foil layer is made of an O-member of pure aluminum or aluminum iron alloy having a thickness of 7 to 100 μm.

It is preferable that the heat resistant resin drawn film layer comprises a drawn film made of a polyamide or polyester with a thickness of 9 to 50 μm.

It is preferable that the heat resistant resin drawn film is 150 N/mm$^2$ or more in tensile strength and 80% or more in tensile elongation of four directions (0°, 45°, 90°, 135°).

It is preferable that the thermoplastic resin not-drawn film layer comprises a drawn film made of a thermoplastic resin selected from the group consisting of polyethylene, polypropylene, olefin copolymer, acid denaturation thereof and ionomer.

The aforementioned casing for an electronic component can be preferably used as a battery casing or a capacitor casing.

According to a second aspect of the present invention, the casing for an electronic component may be formed by deep-drawing or overhang drawing the aforementioned casing material for an electronic component into a predetermined shape.

According to a third aspect of the present invention, an electronic component comprises: an electronic component body; and a casing surrounding the electronic component body, wherein the casing is formed by deep-drawing or overhang-drawing the aforementioned casing material for an electronic component.

The aforementioned electronic component body may be exemplified by a battery such as a lithium ion battery, a polymer battery, a nickel hydrogen battery, a primary battery and a secondary battery.

The aforementioned electronic component body may be also exemplified by a capacitor such as an electrical double layer condenser.

According to a fourth aspect of the present invention, a packaging material for packaging a corrosive content, such as medicine, cosmetic, chemical for photograph and organic solvent, comprises: a heat resistant resin drawn film layer as an outer layer, a thermoplastic resin not-drawn film layer as an inner layer, and an aluminum foil layer disposed between the layers, wherein an acrylic polymer layer is provided between the aluminum foil layer and the not-drawn film layer.

BEST MODE FOR CARRYING OUT THE INVENTION

The casing material for an electronic component according to the present invention can be pressed by means of using a cold (room temperature) pressing method such as an overhang or deep-drawing method. According to the present invention, the casing material is strong even if it is pressed into a thin body. Also, the casing material according to the present invention realizes to form accurately by such a method as an overhang method and a deep-drawing method (which is hereinafter referred to as "pressing"). Furthermore, according to the casing material, an aluminum foil is assured to adhere to a resin layer. Furthermore, the casing material according to the present invention is a laminated member having an aluminum foil, which improves in impermeability of steam and electrolyte. Also, the casing material according to the present invention prevents an aluminum foil from being broken or cracked due to necking at the time of forming.

The aforementioned casing material is preferably useful for a casing for a battery such as a lithium ion battery, a polymer battery or a nickel hydrogen battery, which contains significantly corrosive electrolyte therein and needs to strictly prevent an entering of moisture and/or oxygen. Furthermore, the aforementioned casing material is also useful for a casing of a primary battery, a secondary battery or the like which is required to reduce its weight and size, for which an accurate and sharp formability is required.

The aforementioned casing material is also useful for a casing of a capacitor such as an electrolytic capacitor. Also, the casing material is preferably used as a casing of an electrical double layer capacitor, which has increased capacity, high volumetric energy density and long lifetime regardless of repetition of quick charge and discharge operations, and has been remarkable for an energy source since it accompanies with less occurrence of pollution.

According to the present invention, the aluminum foil, which constitutes the aforementioned casing material for an electronic component, may be made of any material as long as it has appropriate formability. From a viewpoint of easily pressing to form, it is preferable to use pure aluminum or Al—Fe alloy, such as AA-8021 alloy and AA-8079 alloy. As for the thickness thereof, it is preferable to use an O-member (soft material) having a thickness of 7 to 100 µm, preferably 15 to 80 µm, to thereby assure appropriate formability and barrier ability for preventing invasion of oxygen and/or moisture.

In case where the thickness is less than 7 µm, there may be a possibility that the aluminum foil may be unexpectedly broken or cracked at the time of pressing to form. Even if no break or crack occurs, there may be another possibility of generating pinholes and the like thereon, to thereby raise a risk of invasion of oxygen and/or moisture into the case. On the other hand, even if the thickness exceeds 100 µm, there may be no more better prospect to further improve the prevention of the aluminum foil from broken or cracked at the time of pressing to form. Also, there may be no more better prospect to further improve the prevention of a pinhole from generated. Furthermore, increasing of the thickness more than 100 µm merely results in an increasing of weight and a decreasing of volumetric energy density of the resultant product. Accordingly, it is preferable that the thickness does not exceed 100 µm, but not to be limited thereto and be flexible to be varied according to the size of the case produced.

In order to improve chemical resistance and adhesion to a resin film, it is preferable that the aluminum foil is treated on its surface by using a surface treatment agent of chromium, non-chromium (for example, of zirconium).

In order to improve an adhesion of a layer of a resin film, the aluminum foil may be undercoated with a silane coupling agent or a titanium coupling agent, or may be subjected to a corona treatment.

In the casing material for an electronic component, in order to prevent an aluminum foil from being broken or cracked due to necking at the time of pressing as well as to produce an accurate product, it is necessary to laminate a heat resistant resin biaxially drawn film on at least one of the surfaces of the aluminum foil by means of a dry laminate adhesive or the like. The aforementioned heat resistant resin film may be made of polyamide (nylon), polyester, polyimide and polypropylene. Each of the materials may be high in strength, large in elongation and rich in flexibility. It is preferable that the aforementioned heat resistant resin film is made of a biaxial stretching polyamide.

In case of using a polyamide film or a polyester film, it is preferable to use one having comparatively high strength, comparatively large elongation and less directionality as the aforementioned polyamide film or polyester film. Such polyamide film or polyester film as an outer layer is directly laminated on an aluminum foil, so that the aluminum foil may be prevented from necking at the time of pressing to form, so as to obtain a casing having a predetermined accurate shape.

In this case, the film is required to have a thickness of 9 to 50 µm, preferably 12 to 30 µm. In case where the thickness is less than 9 µm, the drawn film may be expanded insufficiently to form, thereby sometimes causing necking in the aluminum foil, which results in poor forming due to break or crack generated in the aluminum foil. On the other hand, in case where the thickness exceeds 50 µm, although the stability to hold its shape may be improved, there may be no more better prospect to further improve the prevention of breaking or cracking, or to further improve its formability. On the contrary, there may be a possibility to reduce the volumetric energy density.

It is preferable that the aforementioned heat-resistant-resin drawn film is 150 N/mm$^2$ or more in tensile strength in any of the four directions (0°, 45°, 90°, and 135°), preferably 200 N/mm$^2$, and that the tensile elongation in any of the four directions is 80% or more, preferably 100% or more. By using such a heat resistant resin drawn film, a casing has a predetermined shape even if it is not made of a film of copolymer.

In particular, in case of using a heat resistant resin drawn film having tensile strength of 200 N/mm$^2$ or more and tensile elongation of 100% or more in any of the four directions, a casing having a further accurate shape can be produced stably.

In cases where the tensile strength in any of the four directions is less than 150 N/mm$^2$ or in cases where the elongation in any of the four directions is less than 80%, there may be a possibility that the casing material may be unexpectedly broken at its corner portion during pressing to sharply form (breaking of the aluminum foil).

Among these heat resistant resin drawn films, a polyamide film has elongation larger than that of a polyester film. Accordingly, it is advantageous to use a polyamide film in case of pressing a battery casing whose height is deeper.

According to the present invention, a polyamide film or a polyester film, which has less directionality in terms of mechanical property, may be directly laminated on an aluminum foil by means of a dry laminate adhesive of urethane. Therefore, the present invention enables to sharply form by means of a cold press method (overhang or a deep-drawing method).

Furthermore, a thermoplastic resin not-drawn film (which is hereinafter referred to as "not-drawn film or the like" for simplification), such as a polyethylene resin film, a polypropylene resin film, a maleic acid denatured polypropylene resin film, an ethylene acrylate copolymer film and an ionomer resin film, may be used as an inner layer material of the casing material for an electronic component. Each of those materials may be used to improve chemical resistance against strong corrosive electrolyte contained in a lithium ion secondary battery and the like, and also to assure heat sealing ability to the casing material to thereby maintain the sealing of the case.

As such a thermoplastic resin un-drawn film or the like, the following materials can be used: polyethylene (PE:

including high density, middle density or low density polyethylene, linear low density polyethylene, and a copolymer with alpha olefin in a small amount); polypropylene (PP: including copolymer with ethylene or another polymerizable monomer in a small amount); denatured polyethylene by maleic anhydride and the like (denatured PE); denatured polypropylene by maleic anhydride or the like (denatured PP); or copolymer of ethylene, acrylic acid and acrylic ester (EAA) or ionomer resin, or a blend composition thereof. It is necessary to laminate the aforementioned not-drawn film on the aluminum foil via an acrylic polymer layer. In cases where the casing is used as a battery, it is preferable to use PP or a denatured PP having high thermal resistance. In cases where the casing is used as a capacitor, it is preferable to use a linear low density polyethylene having good fluidity at the time of heat sealed to a terminal.

Each of the materials, PP, denatured PP and EAA resin is superior in sealing strength at high temperature. Therefore, there is a less possibility for a battery to leak, swell or break under a high temperature preservation examination (safety test).

From a viewpoint of safety at high temperature, polypropylene (which has a melting point of 140 to 170° C. is most optimal to use.

On the other hand, each of those three kinds of resins, that is denatured PE, denatured PP, and EAA or ionomer resin, has good adhesive property to metal (or a metal terminal) as compared with polyethylene, polypropylene or the like. Therefore, there may be a less possibility of causing delamination or the like.

Therefore, it is preferable to use PP when priority is given to high temperature safety. On the other hand, it is preferable to use any of a denatured PE, denatured PP and EAA or ionomer resin when in consideration of a balance between safety and adhesion to metal. Use of these resins enables to give a heat-sealing to the casing material according to the present invention and to obtain sufficient chemical resistance (electrolyte resistance) and stability of form (rigidity).

It is necessary that the not-drawn film has a thickness of 10 to 70 µm, preferably 20 to 55 µm. When the thickness is less than 10 µm, the resultant formed material has a thickness being too thin, to thereby sometimes generate pinholes, which results in decreased corrosion resistance to electrolyte or the like. On the other hand, even if using a film having a thickness of 70 µm or more, there may be no more better prospect to further improve chemical resistance and heat sealing ability, which on the contrary results in mere reducing of volumetric energy.

In order to attain the aforementioned objects, the present inventors have studied eagerly and found the fact that the objects can be attained by providing an acrylic polymer layer between an aluminum foil layer and a not-drawn film layer. Furthermore, the present inventors also have found that a polymer having at least one organic group selected from the group consisting of hindered amino group, cycloalkyl group and benzotriazol (ultraviolet-absorbable) group, each group having a specific structure, can be preferably used as the aforementioned acrylic polymer layer to thereby perform remarkable effects. Thus, the present invention has been completed.

The present invention provides a casing material for an electronic component excellent in impermeability of steam and electrolyte, formability, heat sealing and the like.

According to the present invention, a polymer, which constitutes the acrylic polymer layer provided between the aluminum foil layer and the not-drawn film layer, can be obtained by polymerizing components including 50 mass % or more of (meth)acrylic monomer. It is more preferable that the 80 mass % or more of (meth)acrylic monomer is included as the polymerizable components.

As a polymerizable monomer, the followings can be used: (meth)acrylic acid alkyl ester monomer; a polymerizable monomer having a hydroxyl group; a polymerizable unsaturated carboxylic acid monomer; a polymerizable monomer having a sulfonic acid group; an acid phosphate polymerizable monomer; a polymerizable monomer having an epoxy group; a polymerizable monomer having a nitrogen atom; a polymerizable monomer having a halogen atom; an aromatic polymerizable monomer; vinyl ester; vinyl ether; a polymerizable monomer having a cyano group; a silicon monomer; a monomer having an isocyanate group; a multi functional monomer; and the like. At least one monomer selected from the group above listed may be used.

As a (meth)acrylic acid alkyl ester monomer, the followings can be used:

monomer having a cycloalkyl group such as cyclohexyl (meth)acrylate; methyl cyclohexyl(meth)acrylate; tert-butyl cyclohexyl(meth)acrylate; and cyclo dodecyl(meth)acrylate; methyl acrylate; ethyl acrylate; n-butyl acrylate; iso-butyl acrylate; tert-butyl acrylate; sec-butyl acrylate; n-propyl acrylate; iso-propyl acrylate; isoamyl acrylate; 2-ethylhexyl acrylate; iso-decyl acrylate; tridecyl acrylate; n-octyl acrylate; iso-octyl acrylate; n-lauryl acrylate; benzyl acrylate; dicyclopentanyl acrylate; n-stearyl acrylate; iso-stearyl acrylate; iso-bornyl acrylate; 2-(acetoacetoxy)ethyl acrylate; phenoxyethyl acrylate; methyl methacrylate; ethyl methacrylate; n-butyl methacrylate; iso-butyl methacrylate; tert-butyl methacrylate; sec-butyl methacrylate; n-propyl methacrylate; iso-propyl methacrylate; iso-amyl methacrylate; 2-ethylhexyl methacrylate; iso-decyl methacrylate; tridecyl methacrylate; n-octyl methacrylate; iso-octyl methacrylate; n-lauryl methacrylate; benzyl methacrylate; dicyclopentanyl methacrylate; n-stearyl methacrylate; iso-stearyl methacrylate; iso-bornyl methacrylate, 2-acetoacetoxy ethyl methacrylate (Brand name: AAEM, Eastman); and phenoxyethyl meta-crylate.

As an acrylic monomer having a hydroxyl group, the followings can be used:

2-hydroxy ethyl acrylate; 2-hydroxy propyl acrylate; 3-hydroxy propyl acrylate; 2-hydroxy butyl acrylate; 4-hydroxy butyl acrylate (Brand name: 4HBA, Mitsubishi Chemical); α-hydroxymethyl ethyl acrylate; α-hydroxy methyl acrylate; caprolactone denatured hydroxy acrylate (Brand name: Placcel F Series made by Daicel Chemical Industries, Ltd.); 2-hydroxy ethyl methacrylate; 2-hydroxy propyl methacrylate; 3-hydroxy propyl methacrylate; 2-hydroxy butyl methacrylate; and 4-hydroxy butyl methacrylate; and caprolactone denatured hydroxy methacrylate (Brand name: Placcel F Series made by Daicel Chemical Industries, Ltd).

As a monomer having an acid functional group, acrylic acid; methacrylic acid; maleic acid; fumaric acid; crotonic acid; itaconic acid; maleic anhydride; caprolactone denatured acrylate having a carboxyl group at its end; caprolactone denatured methacrylate having a carboxyl group at its end (Brand name: Placcel FMA series made by Daicel Chemical Industries, Ltd.); sulfoethyl acrylate; sulfoethyl methacrylate; 2-acryloyloxyethyl acid phosphate; 2-methacryloyl oxyethyl acid phosphate; 2-acryloyl oxypropyl acid phosphate; and 2-methacryloyl oxypropyl acid phosphate.

As a vinyl ester, the followings can be used:

acetic acid vinyl ester; butyric acid vinyl ester; caproic acid viny ester; caprylic acid vinyl ester; capric acid vinyl ester; lauric acid vinyl ester; myristic acid viny ester;

palmitic acid vinyl ester; stearic acid vinyl ester; cyclohexane carboxylic acid vinyl ester; pivalic acid vinyl ester; octyl acid vinyl ester; monochloroacetic acid vinyl ester; adipic acid divinyl ester; methacrylic acid vinyl ester; crotonic acid vinyl ester; sorbic acid vinyl ester; benzoic acid vinyl ester; and cinnamic acid vinyl ester.

As a silane compound monomer, the followings can be used:

vinyl trichloro silane; vinyl tris(β-methoxy ethoxy)silane; vinyl triethoxy silane; vinyl trimethoxy silane; γ-methacryloxy propyl trimethoxy silane; trimethylsiloxy ethyl methacrylate halogen; trifluoro ethyl acrylate; tetrafluoro propyl acrylate; octafluoro pentyl acrylate; heptadodecafluoro decyl acrylate; β-(perfluorooctyl)ethyl acrylate; trifluoro ethyl methacrylate; tetrafluoro propyl methacrylate; hexafluoro propyl methacrylate; octafluoro pentyl methacrylate; heptadodecafluoro decyl methacrylate; β-(perfluorooctyl)ethyl methacrylate; tribromophenol EO 3 moles adduct methacrylate; and tribromo phenyl methacrylate.

As a monomer containing a fluorine atom, perfluoro octylethyl acrylate and perfluoro octylethyl methacrylate can be used.

As a polymerizable monomer containing a nitrogen atom, the followings can be used:

a monomer having a hinderd amine group such as: 4-(meth)acryloyloxy-2,2,6,6-tetramethyl piperidine; 4-(meth)acryloyloxy-1,2,2,6,6-pentamethyl piperidine; 4-(meth)acryloylamino-2,2,6,6-tetramethyl piperidine; 4-(meth)acryloylamino-1,2,2,6,6-pentamethyl piperidine; 4-cyano-4-(meth)acryloyl amino-2,2,6,6-tetra methyl piperidine; 4-crotonoyloxy-2,2,6,6-tetramethyl piperidine; 4-crotonoylamino-2,2,6,6-tetramethyl piperidine; 1-(meth)acryloyl-4-(meth)acryloylamino-2,2,6,6-tetramethyl piperidine; 1-(meth)acryloyl-4-cyano-4-(meth)acryloyl amino-2,2,6,6-tetramethyl piperidine; 1-crotonoil-4-crotonoiloxy-2,2,6,6-tetramethyl piperidine; and reactive HALS which is commercially available such as Adkstab LA-82 and Adkstab LA-87 (made by Asahi Denka Kogyo K.K.), and FA-711MM and FA-712HM (made by Hitachi Chemical Co., Ltd.);

a monomer containing a benzotriazol group such as: 2-[2'-hydroxy-5'-(meth)acryloyloxy ethyl phenyl]-2H-benzotriazol; 2-[2'-hydroxy-5'-(meth)acryloyl oxy propyl phenyl]-2H-benzotriazol; 2-[2'-hydroxy-5'-(meth)acryloyl oxy hexyl phenyl]-2H-benzotriazol; 2-[2'-hydroxy-3'-tert-buthyl-5'-(meth)acryloyl oxy ethyl phenyl]-2H-benzotriazol; 2-[2'-hydroxy-3'-tert-buthyl-5'-(meth)acryloyl oxy ethyl phenyl]-5-chloro-2H-benzotriazol; 2-[2'-hydroxy-5'-tert-buthyl-3'-(meth)acryloyl oxy ethyl phenyl]-2H-benzotriazol; 2-[2'-hydroxy-5'-(meth)acryloyl oxy ethyl phenyl]-5-chloro-2H-benzotriazol; 2-[2'-hydroxy-5'-(meth)-acryloyl oxy ethyl phenyl]-5-methoxy-2H-benzotriazol; 2-[2'-hydroxy-5'-(meth)acryloyl oxy ethyl phenyl]-5-cyano-2H-benzotriazol; 2-[2'-hydroxy-5'-(meth)acryloyl oxy ethyl phenyl]-5-t-buthyl-2H-benzotriazol; and 2-[2'-hydroxy-5'-(β-methacryloyloxy ethoxy)-3'-tert-butylphenyl]-4-tert-butyl-2H-benzotriazol;

acrylamides such as: acrylamide; t-butyl acrylamide; methylene bis acrylamide; methoxy methyl acrylamide; ethoxy methyl acrylamide; buthoxy methyl acrylamide; methylol acrylamide; methacrylamide; methylene bis methacrylamide; methylol methacrylamide; N-isopropyl acrylamide; N-methylol acrylamide; N-methoxy methyl acrylamide; N-buthoxy methyl acrylamide; diacetone acrylamide; N,N-dimethyl amino propyl acrylamide; N-phenyl maleimide; N-cyclohexyl maleimide; 2-iso-propenyl-2-oxyazoline;

a monomer having an isocyanate group such as: 2-methacryloyl oxyethyl isocyanate (Brand name: Karenz MOI made by Showa Denko K.K.); methacryloyl isocyanate (Brand name: MAI made by Nippon Paint Co., Ltd.); m-iso-propenyl-α,αdimethyl benzyl isocyanate (Brand name: m-TMI made by Takeda Chemical Industries, Ltd.); and imide acrylate; imide methacrylate; dimethyl amino ethyl acrylate; dimethyl amino ethyl methacrylate; diethyl amino ethyl acrylate; diethyl amino ethyl methacrylate; quaternary dimethyl amino ethyl acrylate; quaternary dimethyl amino ethyl methacrylate; methacryloyl oxyethyl trimethyl ammonium chloride; dimethyl amino ethyl methacrylate sulfate; morpholine EO adduct methacrylate; N-vinylpyridine; N-vinyl imidazole; N-vinyl pyrrole; N-vinyl pyrrolidone; N-vinyl oxazolidon; N-vinyl succinicimide; N-vinyl methyl KARUPEMATE; N, N-methyl vinyl acetamide, etc.

As a multi-functional polymerizable monomer, the followings can be used; ethylene glycol diacrylate; diethylene glycol diacrylate; triethylene glycol diacrylate; polyethylene glycol #200 diacrylate; polyethylene glycol #400 diacrylate; polyethylene glycol #600 diacrylate; polyethylene glycol #1000 diacrylate; 1,3-butylene glycol diacrylate; 1,4-butanediol diacrylate; 1,6-hexanediol diacrylate; 1,9-nonanediol diacrylate; neopentyl glycol diacrylate; polypropylene glycol #400 diacrylate; EO adduct trimethylolpropane triacrylate; pentaerythritol triacrylate; pentaerythritol tetra acrylate; di-penta erythritol hexa acrylate; tris acryloyl oxyethyl phosphate; ethylene glycol dimethacrylate; diethylene glycol dimethacrylate; polyethylene glycol #200 dimethacrylate; polyethylene glycol #400 dimethacrylate; polyethylene glycol #600 dimethacrylate; 1,4-butanediol dimethacrylate; 1,6-hexanediol dimethacrylate; neo pentyl glycol dimethacrylate; polypropylene glycol #400 dimethacrylate; glycerol dimethacrylate; 2-hydroxy-1,3-dimethacryloxy propane diacrylate; 2,2-bis[4-(methacryloxy ethoxy)phenyl]propane diacrylate; 2,2-bis[4-(methacryloxy diethoxy)phenyl]propane diacrylate; 2,2-bis[4-(methacryloxypolyethoxy)phenyl]propane diacrylate EO denatured bisphenol A diacrylate; PO denatured bisphenol A diacrylate trimethylol propane triacrylate; PO denatured bisphenol A diacrylate trimethylol-propane trimethacrylate; and 2,2-bis[4-(meth-cryloxydiethoxy)phenyl]propan dimethacrylate, etc.

As vinyl ether, the followngs can be used; vinyl methyl ether; vinyl ethyl ether; vinyl iso-propyl ether; vinyl iso-butyl ether; vinyl n-butyl ether; vinyl n-amyl ether; vinyl iso-amyl ether; vinyl 2-ethyl hexyl ether; vinyl n-octadecyl ether; cyanomethyl vinyl ether; 2,2-dimethyl aminoethyl vinyl ether; 2-chloroethyl vinyl ether; β-difluoromethyl vinyl ether; benzyl vinyl ether; phenyl vinyl ether; divinyl ether; and divinyl acetal, etc.

As a polimerizable monomer having an epoxy group, the followings can be used; glycidyl acrylate, α-methyl glycidyl acrylate, 3,4-epoxy cyclohexyl methyl acrylate (Brand name: CYCLOMER A200, made by Daicel Chemical Industries, Ltd), glycidyl methacrylate, α-methyl glycidyl methacrylate (Brand name: M-GMA, made by Daicel Chemical Industries, Ltd), and 3,4-epoxy cyclohexyl methyl methacrylate (Brand Name: CYCLOMER M100, Daicel Chemical Industries, Ltd).

As another monomer in addition to the monomers listed above, the followings can be used; styrene, α-methyl styrene, vinyl toluene, vinyl acetate, vinyl chloride vinylidene chloride and a compound such as a macromer of AS-6, AN-6 and AA-6 (To a Gosei Co, Ltd) and so on.

For incorporating a hindered amine group into a polymer, a monomer having a hindered amine group may be copolymerized. One kind or two or more kinds of such monomer having a hindered amine may be used for copolymerization.

For incorporating a cycloalkyl group into a polymer, at least one kind of the monomer having a cycloalkyl group as described before may be copolymerized.

For incorporating a benzotriazol group into a polymer, the monomer having a benzotriazol group as described before may be copolymerized. One kind or two or more kinds of the monomer having a benzotriazol group may be used.

An acrylic polymer layer, which is made of a polymer obtained by copolymerizing the aforesaid monomer having a hindered amine group, may improve the strength of adhesion between an aluminum foil and a not-drawn film.

Use of a copolymer, which is obtained by copolymerizing the aforementioned monomer having a cycloalkyl group, allows the acrylic polymer layer to have an impermeability of steam and a water resistance.

Use of a copolymer, which is obtained by copolymerizing the aforesaid monomer having a benzotriazol monomer, allows the acrylic polymer layer to have an impermeability of steam and a water resistance.

Also, although the present invention does not limit to a particular range of the content of those monomer, the following ranges are preferable: It is preferable that the content of a monomer having a hindered amine group is defined between 0.1 to 10.0% by weight. It is preferable that the content of a monomer having a cycloalkyl group is defined between 5.0 to 97.8% by weight. It is preferable that the content of a monomer having a benzotriazol group is defined between 0.1 to 50.0% by weight. It is also preferable that a content of another monomer in addition to the ones listed above is defined between 2.0 to 94.8% by weight. Such contents particularly described here may preferably make a 100% by weight of polymer.

Furthermore, as mentioned relating to a polymer constituting the acrylic polymer according to the present invention, it is preferable to use an acrylic polymer having a cycloalkyl group obtained by polymerizing a monomer component containing at least a monomer having a cycloalkyl group, in order to obtain a good property for used as a casing material for a battery.

Further, it is also preferably to use an acrylic polymer having a cycloalkyl group, as well as a hindered amine group and/or a benzotriazol group. Such acrylic polymer may be obtained by polymerizing monomer components containing a monomer having a cycloalkyl group as well as a monomer having a hindered amine group and/or a monomer having a benzotriazol group.

Each component is mixed in a predetermined content to obtain a mixture, which is polymerized by means of one of the known polymerizing methods to obtain a polymer. Among the known polymerizing methods, it is preferable to use a method of solution polymerization since it is not required to add another solvent to dissolve a polymer into the solvent for application, and in addition that the method may provide a polymer solution without containing an additional component such as surfactant and so on.

As an organic solvent, the followings can be used. One kind or two or more kinds may be used:

as an aromatic hydrocarbon solvent, such as toluene, xylene, Sorbeso 1000 (by Maruzen Sekiyu Kagaku Co. Ltd), Sorbeso 1500 (by Maruzen Sekiyu Kagaku Co, Ltd), mineral spirit solvents, ethyl acetate, n-propyl acetate, n-butyl acetate, isobutyl acetate, n-amyl acetate, ethylene glycol ethyl ether acetate (cellosolve acetate), and propylene glycol mono methyl ether acetate (Arcosolv PMA, by Kuraray Co. Ltd);

as a ketone solvent, such as acetone, methyl ethyl ketone, methyl isobutyl ketone and cyclohexanone;

as an alcohol solvent, such as methanol, ethanol, n-propyl alcohol, isopropyl alcohol, n-butyl alcohol, cyclohexanol, ethylene glycol, propylene glycol, propylene glycol mono methyl ether (brand name: PGM, by Kuraray Co. Ltd), propylene glycol mono ethyl ether (brand name: PE, by Kuraray Co. Ltd), propylene glycol tertiary butyl ether (brand name: PTB, by Kuraray Co. Ltd), 3-methyl-3-methoxy butanol (brand name: Solfit, by Kuraray Co. Ltd), and dipropylene glycol mono methyl ether (brand name: D-PGM, by Kuraray Co. Ltd);

as an ether solvent, such as ethylene glycol mono methyl ether(methyl cellsolve), ethylene glycol mono ethyl ether (ethyl cellosolve), ethylene glycol mono butyl ether(butyl cellosolve), diethylene glycol mono ethyl ether(ethyl Carbitol), and diethylene glycol mono butyl ether(butyl Carbitol); and as another solvent in addition to the solvents as listed above, such as tetrahydrofuran, N,N-dimethyl formamide, dimethyl acetamide, dioxane, chloroform and so on.

As a polymerization initiator which is useful for the present inbention, the followings can be used; 2,2'-azobis-(2-ethyl butyronitrile), t-butyl peroxy-2-ethyl hexanoate and so on. Such polymerization initiator may be used in a range from 0.05 to 20% by weight, and in particularly from 0.1 to 10% by weight, in the total weight of the polymerizable monomers.

As an azo initiator, the followings can be used; 2,2'-azobis-(2-methyl butyronitrile) (brand name: ABN-E, by Japan Hydrazine Company, Inc.), 2,2'-azobis isobutyronitrile (brand name: AIBN, by Japan Hydrazine Company, Inc.), and 2,2'-azobis(2,4-dimethyl valeronitrile) (brand name: ABN-V, by Japan Hydrazine Company, Inc.).

As a peroxide initiator, the followings can be used; benzoyl peroxide (brand name: Nyper B W, by Nihon Yushi K.K. (NOF Corporation)), 1,1-bis (t-butyl peroxy)-3,3,5-trimethyl cyclohexane (brand name: Perhexa 3M, by Nihon Yushi K.K. (NOF Corporation)), and t-butyl peroxy-2-ethyl hexanoate (brand name: Perbutyl O, by Nihon Yushi K.K. (NOF Corporation)).

Such a polymerization initiator as listed above may be used in an amount of 0.05 to 20% by weight, and in particularly of 0.1 to 10% by weight, in the total weight of the polymerizable monomer. It is preferable that the polymerization reaction is carried out at a temperature approximately between room temperature and 200° C., and in particular between 40 and 140° C.

As a chain-transfer agent, the followings can be used; n-dodecyl mercaptan, tert-dodecyl mercaptan, n-butyl mercaptan, γ-mercapto propyl trimethoxy silane and so on.

Each compound may be used alone or in combination. It is preferable that the compound may be used in an amount of 0.1 to 10% by weight in the total amount of the monomer.

As a chain-transfer agent, alkyl mercaptans such as n-butyl mercaptan, n-hexyl mercaptan, n-octyl mercaptan, n-dodecyl mercaptan, t-dodecyl mercaptan, cetyl mercaptan and stearyl mercaptan can be exemplified. Also, as another mercaptans in addition to the compound as listed above, such as thioglycolic acid, thioglycerol, ethylene thioglycol, thioglycolic acid 2-ethyl hexyl, 2-mercapto ethanol, mercapto glycerol, mercapto succinic acid, and mercapto propolonic acid may be exemplified. In addition, disulfide, dimethylxanthogen disulfide, secondary alcohols, isopropyl alcohol, dioxane, tetrahydrofuran, isopropyl benzole, α-methyl styrene dimer, and 2,4-diphenyl-4-methyl-1-pentene may be exemplified. Also, as a halogen compound, carbon tetrachloride, chloroform, trichloro bromo ethane, bromoform and so on may be exemplified.

Objective properties according to the present invention may be obtained by provision of the acrylic polymer layer between the aluminum foil layer and the not-drawn film layer. Additionally, crosslinkage therebetween by reacting with an isocyanate group allows the polymer layer to have a further property of electrolyte and heat resistance.

In this case, a polymerizable monomer having a hydroxyl group is a necessary component of a raw material of the polymer, which is reacted with an isocyanate group. The component may be used in an amount of 2.0 to 35% by weight, and in particular of 3.5 to 23% by weight, in the monomer components so as to prepare a copolymer. In case of less than 2.0% by weight, the content of the hydrogen group in the resultant polymer may be too little so that the reactivity with a polyisocyanate may be decreased, which results in decreasing a crosslinking density. Therefore, it is difficult to obtain a sufficient adhesion, which is one of the objects of the present invention. On the other hand, in case of more than 35% by weight, a stability of storage after incorporating a polyisocyanate may be unstable.

Therefore, in case where the polymer of an acrylic polymer layer is made of acrylic polyol, it is possible to crosslink an isocyanate group as described above so as to obtain one of preferable embodiments. In particular, as an acrylic polyol according to the present invention, at least one selected from a group consisting of a polymerizable monomer having a hydrogen group may be used.

As a compound having an isocyanate group used for the above mentioned treatment, any polyisocyanate may be used as long as it has two or more isocyanate groups in its molecular. For example, trimethylene diisocyanate, 1,6-hexamethylene diisocyanate, tolylene diisocyanate, xylene diisocyanate, diphenyl methane diisocyanate, and isophorone diisocyanate may be exemplified. Also, a derivative from that diisocyanate such as adduct polyisocyanate compound such as trimethylol propane adduct, biuret compound, and isocyanurate compound may be exemplified. Also, blocked isocyanate compounds, where the isocyanate group of the isocyanate compounds as above mentioned is blocked by ε-caprolactam, phenol, cresol, oxime, alcohol and so on, may be exemplified. One kind or two or more kinds of the compound as mentioned above may be used into a mixture.

In this case, the isocyanate group of the polyisocyanate compound may be contained in an amount of 0.5 to 2.0 equivalents, and in particular of 0.8 to 1.5 equivalents, with comparison of 1 equivalent of the hydrogen group in the polymer, in order to crosslink.

It is preferable to use a known catalyst, for example, organic tin compound such as dilauric acid di-n-butyl tin (di-n-butyltin dilaurate), or tertiary amine or the like, in order to promote the reaction of isocyanate group into an urethane. At the moment when the obtained polymer is applied on an aluminum foil, it is possible to optionally add a various kind of additives for a paint such as organic solvent, filler, leveling agent, plasticizer, stabilizer, dye, pigment and so on.

Relating to the lamination comprising an aluminum foil and films, which constitutes the casing material of an electronic component according to the present invention, the heat resistant resin drawn film may be provided on the both surfaces of the aluminum foil, and is necessary to be provide at least on the outer layer, which is an opposite side of the aluminum foil having a not-drawn film layer, by directly laminating by means of an adhesives. Therefore, there may be less possibility of break or crack by necking of the aluminum foil.

Between the aluminum foil and the thermoplastic resin not-drawn film, a solution may be applied to coat or be subjected to a melt-coat or a dry lamination of the film of a polymer to be formed, so as to obtain an acrylic polymer layer.

The thermoplastic resin not-drawn film is positioned at the most inside portion of the casing material with the acrylic polymer layer. In other word, the thermoplastic resin not-drawn film is positioned at the inside of the casing when assembled into a battery casing. Therefore, the thermoplastic resin not-drawn film allows the casing material for an electronic component to have a heat sealing property as well as to assure chemical resistance of the casing.

As to laminating, in case of laminating a heat resistant resin drawn film such as polyamide film, it is required to use a dry laminate adhesives, and in particular, an urethane dry laminate adhesives. On the other hand, in case of laminating a thermoplastic resin not-drawn film of polyethylene, polypropylene, ethyleneacrylate copolymer (EAA), ionomer resin and the like onto an aluminum foil, an acrylic polymer layer may be used for laminating.

The casing material for an electronic component according to the present invention generally comprises a combination of a heat resistant resin drawn film, an aluminum foil, a polymer layer of acrylic polyol and a thermoplastic resin not-drawn film. According to the present invention, the casing material is preferably designed to have a total thickness of 150 μm or less (including a thickness of a dry laminate). Even if such a thickness, the casing material may accomplish the objects of the present invention and it is not necessary to have a thickness more than that described above. However, the present invention does not limit thereto and may vary depending on the size of a battery or a capacitor. An excess thickness of the casing material may decrease a volumetric energy density.

When using the casing material for an electronic component according to the present invention, the casing material may be efficiently and productively pressed to form into a casing by means of a cold deep-drawing or overhang method. Also, it is possible to seal by a heat sealing so that the casing material may be pressed to form without providing an specific area or a volume for sealing, which is necessary for the prior art material, and the casing for an electronic component according to the present invention has a sharp shape. The casing material according to the present invention also may be prepared to be thin. Consequently, the casing material according to the present invention allows to produce a battery or a capacitor having a high volumetric energy density or a high gravimetric energy density.

The present invention does not limit to a particular process for preparing a battery casing, and it may be produced by using a known process. The casing material according to the present invention may be preferably pressed by a cold (or a room temperature) forming method so that it is not required to heat at pressing. Therefore, there is no need to be taken into consideration of deorientation of the drawn film due to heating at pressing or of occurrence of delamination between the aluminum foil and the heat resistant resin drawn film due to heat shrinkage of the drawn film. Therefore, the casing material according to the present invention may be formed into a battery casing having sharpness and large strength. In case of required to be formed into a casing whose height is larger, it is formed stepwise.

Further, the casing material for an electronic component according to the present invention has a less directionality in terms of a mechanical property, so that it has a feature to be pressed without lubricating in case of using a overhang method or a deep-drawing method in which the height of the formed body is lower (in particular, 5 mm or less).

Also, the casing material for an electronic component is superior to heat sealing property, chemical resistance, formability and the like. Therefore, the casing material according to the present invention is useful not only for a battery casing but also for a casing for packaging chemical product, cosmetic, chemical for photograph and the like, which has a high corrosiveness or includes an organic solvent.

EXAMPLE

The invention is now described based on the following present examples and comparative examples. However, the present invention is not intended to be limited by the following description. In the following description about the present examples and the comparative examples, "part" means "part by weight" and "%" means "% by weight"

Adhesives for an Outer Layer" (Acrylic Polymer)

Present Example 1

Into a four inlets flask equipped with a thermometer, a leading pipe for nitrogen, a dripping funnel, a cooling tube and a stirrer, 55 parts of ethyl acetate as a solvent was prepared and heated into 80° C. On the other hand, 3 parts of 4-methacryloyloxy-2,2,6,6-tetramethyl piperidine as a polymerizable monomer having a hindered amine group, 1 part of 2-[2'-hydroxy-5'-(methacryloyloxyethyl) phenyl]-2H-benzo triazole (which is hereinafter referred to as "Benzotriazole (A)") as a polymerizable monomer having a cycloalkyl group, and 5 parts of hydroxy ethyl methacrylate, 30 parts of butyl methacrylate as another polymerizable monomer, 0.5 parts of methacrylic acid as another polymerizable monomer, 20.5 parts of butyl acrylate as another polymerizable monomer, and 0.5 parts of 2,2'-azobis isobutyronitrile as a polymerization initiator (which is hereinafter referred to as "initiator") were mixed together in a mixture, which was prepared to be put into a dripping funnel. Then the mixture is dripped with duration of 2 hours with stirring at 80° C. with flowing nitrogen gas. Further, mixture is kept heated with stirring at 80° C. for 4 hours for copolymerization.

Then, with the thereby obtained copolymer solution, a multi functional isocyanate (Sumidur N-3200; by Sumitomo Bayer Urethane Co, Ltd) as a crosslinking agent was measured to be mixed in such amount as the equivalent ratio of the isocyanate group to the hydroxyl group was 1:1. Further, ethyl acetate was added for dilution to adjust viscosity thereof.

The resultant solution was applied on an aluminum foil and compulsory dried at 100° C. for 20 seconds, and then a CPP or an ionomer film was attached together to obtain a test piece.

With a mixing ratio shown in table 1, an acrylic polymer was synthesized in a way similar to the case of Example 1, and incorporated a multi functional isocyanate thereto to obtain a test piece.

Present Examples 1 to 6, and Comparative Example 1

A Casing Material for an Electronic Component

A heat resistant resin drawn film, a thermoplastic resin not-drawn film and an aluminum foil of aluminum iron alloy (AA Standard, 8079, O-member) was used. Also, an urethane dry laminate adhesives (AD502/CAT10, by Toyo Morton Co, Ltd) was used as an adhesives for an outer layer, and an adhesives of acrylic polymer was used as an adhesives for an inner layer.

In this specification, the following abbreviations are used.
1. Each of the four directions means each of the directions of 0°, 45°, 90° and 135° deviated from a tensile direction as standard.
2. Al: an aluminum foil
3. ON①: a polyamide film
   [tensile strength: four directions=250 N/mm$^2$, 265 N/mm$^2$, 250 N/mm$^2$, and 245 N/mm$^2$]
   [tensile elongation: four directions=162%, 140%, 153%, and 155%]
4. ON②: a polyamide film
   [tensile strength: four directions=188 N/mm$^2$, 235 N/mm$^2$, 215 N/mm$^2$, and 195 N/mm$^2$]
   [tensile elongation: four directions=121%, 86%, 99%, and 89%]
5. ON③: a polyamide film
   [tensile strength: four directions=168 N/mm$^2$, 135 N/mm$^2$, 151 N/mm$^2$, and 144 N/mm$^2$]
   [tensile elongation: four directions=112%, 66%, 89%, and 67%]
6. PET①: a polyester film
   [tensile strength: four directions=220 N/mm$^2$, 245 N/mm$^2$, 265 N/mm$^2$, and 221 N/mm$^2$]
   [tensile elongation: four directions=122%, 90%, 105%, and 98%]
7. LLDPE: a linear low density polyethylene film
8. CPP: a not-drawn polypropylene film
9. IO: an ionomer resin film
10. Dry: adhesives for an outer layer (an urethane adhesives)

Table 1 shows a constituent of monomers constituting an acrylic polymer provided between an aluminum foil and a not-drawn film.

TABLE 1

| | Polymer Adhesive agent | | | | | | Adhesive agent |
|---|---|---|---|---|---|---|---|
| | Example Nos. 1 & 7 Adhesive agent No. 1 | Example No. 2 Adhesive agent No. 2 | Example No. 3 Adhesive agent No. 3 | Example No. 4 Adhesive agent No. 4 | Example No. 5 Adhesive agent No. 5 | Example No. 6 Adhesive agent No. 6 | Comparative Example No. 1 Adhesive agent No. 7 |
| 4-methacryloyloxy-2, 2,6,6-tetramethyl piperidine (a) | 3 | 0.5 | — | — | 1 | 1 | dry laminate adhesives of urethane |
| cyclohexyl methacrylate (b) | 40 | 30 | 30 | — | 30 | 30 | |
| 2-[2'-hydroxy-5'-methacryloyloxy ethyl phenyl]-2H-benzotriazole (c) | 1 | — | — | — | 0.5 | 1 | |
| hydroxy ethyl methacrylate | 5 | 10 | 10 | 10 | 2 | 1 | |
| butyl methacrylate | 20 | 20 | 20 | 20 | 26 | 26 | |
| methacrylic acid | 0.5 | 0.5 | 0.5 | 0.5 | 0.5 | 0.5 | |
| butyl acrylate | 30.5 | 39 | 39.5 | 39.5 | 40 | 40.5 | |
| methyl methacrylate | — | — | — | 30 | — | — | |

(Construction of a Laminate Member)
Present Example 1: ON①$^{25}$/Dry/Al$^{40}$/Adhesives 1/CPP$^{30}$ (the total thickness of the casing material: 100 μm)
Present Example 2: ON②$^{25}$/Dry/Al$^{40}$/Adhesives 2/IO$^{50}$ (the total thickness of the casing material: 120 μm)
Present Example 3: ON②$^{25}$/Dry/Al$^{40}$/Adhesives 3/CPP$^{30}$ (the total thickness of the casing material 100 μm)
Present Example 4: PET①$^{16}$/Dry/Al$^{40}$/Adhesives 4/CPP$^{30}$ (the total thickness of the casing material: 91 μm)
Present Example 5: ON②$^{25}$/Dry/Al$^{40}$/Adhesives 5/CPP$^{30}$ (the total thickness of the casing material: 100 μm)
Present Example 6: PET①$^{16}$/Dry/Al$^{40}$/Adhesives 6/CPP$^{30}$ (the total thickness of the casing material: 91 μm)
Present Example 7: ON①$^{25}$/Dry/Al$^{40}$/Adhesives 1/LL-DPE$^{30}$ (the total thickness of the casing material: 100 μm)
Comparative Example 1: ON①$^{25}$/Dry/Al$^{40}$/Adhesives 7/CPP$^{30}$ (the total thickness of the casing material: 100 μm)

(Evaluation Method of the Formability)
The obtained casing material for an electronic component was formed into a blank shape having a size of 110 mm×180 mm, and then a first step forming using a straight metallic mold in which a height of the formed body was not defined was carried out. The formability was evaluated by comparing each of the heights of the formed casing materials.

The metallic mold used here had a punch shape having a longer side of 60 mm, a shorter side of 45 mm, a radius at its corner of 1 to 2 mm, a radius at its punch shoulder of 1 mm, and a radius at its die shoulder of 0.5 mm. The result obtained is shown in Table 1.

(The Evaluation of the Sealing Property)
Into a rectangular casing formed as described above, an electrolyte (dimethyle carbonate+ethyl carbonate (DMC: EC=1:1)+lithium salt) was charged, and then heat-sealed. Then, the casing was laid to be stored for 30 days at 60° C. After the storage, whether a leakage of the seal occurred or not was checked. The result is shown in Table 2.

(Evaluation Method of the Permeability of Steam)
Into a rectangular casing formed as described above, a battery was charged, and then heat-sealed. Then, thereby sealed casing was stored at an atmosphere having 60°×90% RH for 7 days, and then a water content of the electrolyte was measured by means of Karl Fisher method. The result is shown in Table 2.

(Evaluation Method of the Electrolyte Resistance)
A Strength of the laminate was measured after immersed in an electrolyte (dimethyl carbonate:ethyl carbonate=1:1+ Li salt) for 7 days at room temperature.

TABLE 2

| | Forming height | | Sealing Performance | impermeability | impermeability |
|---|---|---|---|---|---|
| | Corner R2 | Corner R1 | Leaking | of steam | of electrolyte |
| Example 1 | ⊙ | ○ | No leaking | ⊙ | ○ |
| Example 2 | ○ | Δ | No leaking | ⊙ | ○ |
| Example 3 | ○ | Δ | No leaking | ⊙ | ○ |
| Example 4 | ○ | Δ | No leaking | ○ | ○ |
| Example 5 | ○ | Δ | No leaking | ⊙ | ○ |
| Example 6 | ○ | Δ | No leaking | ⊙ | Δ |
| Example 7 | ⊙ | ○ | No leaking | ⊙ | ○ |
| Comparative Example 1 | X | X | No leaking | X | Δ |

Also, table 3 shows a standard for evaluating.

TABLE 3

| Evaluation | Formability | impermeability of steam | impermeability of electrolyte |
|---|---|---|---|
| ⊚ | 5 mm or more | 50 ppm or less | Laminating strength: No change |
| ○ | 3 to 5 mm | 50 to 100 ppm | Laminating strength: Remaining rate 60% or more |
| Δ | 2 to 3 mm | 100 to 300 ppm | Laminating strength: Remaining rate 30% or more |
| X | Less than 2 mm | 300 ppm or more | Laminating strength: Delaminated |

The casing according to the present invention is superior in formability and may be pressed to form into a product having a sharp shape by means of overhang or deep-drawing method. The casing material is also superior to strength, adhesion between an aluminum and a resin layer, impermeability of steam and electrolyte, formability, heat seal property, and corrosion resistance to an electrolyte. The present inventors have studied for developing a casing material for an electronic component having above mentioned properties. The present inventors have found that the objects may be accomplished by that the casing material comprising an acrylic polymer layer provided between an aluminum foil layer and a not-drawn film layer. Also, the present inventor has found that a polymer having at least one organic group selected from a group consisting of hindered amine group, cycloalkyl group and benzo triazol group, each group having a specific structure, shows an significant property, and to reach the present invention.

In particular, a heat resistant resin drawn film is provided as an outer layer, and an acrylic polymer layer is provided between an aluminum foil and a thermoplastic resin not-drawn film, so that necking break at pressing of the aluminum foil may be avoided. Also, the present invention may form a casing having impermeability of steam and electrolyte, formability, heat seal property, mechanical strength, stability in storage at high temperature, and chemical resistance.

INDUSTRIAL APPLICABILITY

The present invention is useful for a casing material for an electronic component for a secondary storage battery, an electronic double layer capacitor and so on which is high in volumetric energy density, gravimetric energy density and efficiency. Also, the present invention is useful for a casing material for packaging not only an electronic component but also a medical product, a cosmetic, a high corrosive content such as chemical with an organic solvent for photograph.

The invention claimed is:

1. A casing material for an electronic component, comprising:
   an outer layer comprising a heat resistant resin drawn film;
   an inner layer comprising a thermoplastic resin not-drawn film;
   a foil layer comprising aluminum and provided between said outer layer and said inner layer; and
   a polymer layer provided between said foil layer and said inner layer, said polymer layer comprising an acrylic polymer having a hindered amine group, a cycloalkyl group and a benzotriazol group.

2. The casing material for an electronic component as recited in claim 1, wherein said acrylic polymer comprises an acrylic polymer including an acrylic polyol crosslinked with isocyanate.

3. The casing material for an electronic component as recited in claim 1, wherein said thermoplastic resin not-drawn film comprises a not-drawn film comprising a thermoplastic resin selected from the group consisting of polyethylene, polypropylene, olefin copolymer, polyethylene denatured by acid, polypropylene denatured by acid, olefin copolymer denatured by acid, and ionomer.

4. A battery casing comprising a casing material for an electronic component as recited in claim 1.

5. A capacitor casing comprising a casing material for an electronic component as recited in claim 1.

6. A casing for an electronic component formed by deep-drawing or overhanging said casing material for an electronic-component as recited in claim 1 into a predetermined shape.

7. The casing material for an electronic component as recited in claim 1, wherein said acrylic polymer is obtained by polymerizing:
   a monomer having cycloalkyl group: 5.0 to 97.8% by weight;
   a monomer having hindered amine group: 0.1 to 10.0% by weight;
   a monomer having benzotnazol group: 0.1 to 50.0% by weight; and
   a polymerizable monomer: 2.0 to 94.8% by weight.

8. The casing material for an electronic component as recited in claim 1, wherein said foil layer comprises one of pure aluminum and an aluminum iron alloy.

9. The casing material for an electronic component as recited in claim 8, wherein said foil layer has a thickness of 7 to 100 μm.

10. The casing material for an electronic component as recited in claim 1, wherein said heat resistant resin drawn film comprises one of polyamide and polyester and said heat resistant resin drawn film has a thickness of 9 to 50 μm.

11. The casing material for an electronic component as recited in claim 10, wherein said heat resistant resin drawn film has tensile strength of 150 N/mm$^2$ or more in the four directions (0°, 45°, 90°, 135°), and tensile elongation of 80% or more.

12. An electronic component, comprising:
   an electronic component body; and
   a casing surrounding said electronic component body,
   wherein said casing is formed by deep-drawing or overhanging said casing material for an electronic component as recited in claim 1.

13. The electronic component as recited in claim 12, wherein said electronic component body is a battery.

14. The electronic component as recited in claim 13, wherein said battery is one of a lithium ion battery, a polymer battery, a nickel-hydrogen battery, a primary battery and a secondary battery.

15. The electronic component as recited in claim 12, wherein said electronic component body is a capacitor.

16. The electronic component as recited in claim 15, wherein said capacitor is an electrical double layer capacitor.

17. A packaging material for packaging corrosive contents, said packaging material comprising:
   an outer layer comprising a heat resistant resin drawn-film;
   an inner layer comprising a thermoplastic resin not-drawn film;

a foil layer comprising aluminum and provided between said outer and inner layers; and a polymer layer provided between said foil layer and said inner layer, said polymer layer comprising an acrylic polymer having a hindered amine group, a cycloalkyl group and a benzotriazol group.

18. The packaging material as recited in claim 17, wherein said acrylic polymer comprises an acrylic polymer including a polyol crosslinked with isocyanate.

19. The packaging material as recited in claim 17, wherein said thermoplastic resin not-drawn film comprises a thermoplastic resin selected from the group consisting of polyethylene, polypropylene, olefin copolymer, acid denatured compound and ionomer.

20. The packaging material as recited in claim 17, wherein said acrylic polymer is obtained by polymerizing:

a monomer having cycloalkyl group: 5.0 to 97.8% by weight;

a monomer having hindered amine group: 0.1 to 10.0% by weight;

a monomer having benzotriazol group: 0.1 to 50.0% by weight; and a polymerizable monomer: 2.0 to 94.8% by weight.

21. The packaging material as recited in claim 17, wherein said foil layer comprises one of aluminum and an aluminum iron alloy.

22. The packaging material as recited in claim 21, wherein said foil layer has a thickness of 7 to 100 μm.

23. The packaging material as recited in claim 17, wherein said heat resistant resin drawn film comprises one of polyamide and polyester and said heat resistant resin film has a thickness of 9 to 50 μm.

24. The packaging material as recited in claim 23, wherein said heat resistant resin drawn film has a tensile strength of 150 N/mm$^2$ or more in the four directions (0°, 45°, 90°, 135°) and a tensile elongation of 80% or more.

* * * * *